Jan. 20, 1959 W. L. LEHNER 2,869,497

SOLDERING MACHINE

Filed Jan. 11, 1954

INVENTOR.
WILLIAM L. LEHNER
BY John P. Harvey
ATTORNEY

United States Patent Office 2,869,497

Patented Jan. 20, 1959

2,869,497

SOLDERING MACHINE

William L. Lehner, Snyder, N. Y., assignor to Sylvania Electric Products Inc., a corporation of Massachusetts Application January 11, 1954, Serial No. 403,171

4 Claims. (Cl. 113—59)

The present invention relates to soldering machines and methods and, particularly, to a machine and method for applying molten solder to a discrete area or areas of an article to be soldered. While the invention is of general application, it has particular utility in connection with the simultaneous soldering of multiple discrete electrical connections during fabrication of a unitary electrical assembly and will be described in that connection.

A unitary assembly or sub-assembly of electrical components ordinarily requires that a plurality of electrical connections be made, some between the components themselves or between such components and electrical conductors or both. These connections are frequently joined by solder to insure a good mechanical bond and a uniform and reliable connection of low electrical resistance. It has heretofore been proposed that such assemblies be fabricated by the use of a chassis or base plate of electrical insulating material having conductors suitably affixed on the bottom surface and thereof and having the electrical components positioned on the top surface, the electrical leads of the components extending through apertures in the base plate for soldering on the bottom side either with each other or with the electrical conductors or both as required. Sometimes hollow metallic eyelets are riveted in such apertures and the component leads extend through the eyelets to insure a better mechanical and electrical bond at the soldered connection.

The soldering of the connections of such an assembly may be performed by hand, but it has been proposed that it be accomplished by dipping the conductor side of the base plate into a molten bath of solder. The latter method, however, has certain undesirable limitations and disadvantages. The electrical conductors themselves are in contact along their entire lengths with the molten solder, conventionally of thin ribbon configuration affixed flat-wise to the base plate and thus present appreciable area to the molten solder. Since they are solder clings to them when they are removed from the bath and this not only unnecessarily builds up their cross-sectional area but in addition is very wasteful of solder. Also, solder tends to bridge over small gaps between two closely placed conductors and thus complete direct electrical connections between them where none was intended or desired. There is the further disadvantage that baths of molten solder required by this method have their upper surface necessarily exposed to the air so that oxide readily forms on such exposed surface at its elevated temperature of several hundred degrees, and this oxide formation occurs anew after each of the repeated dipping operations. Dross and scum also forms during operation and floats with the oxide on the molten surface, thereby tending to impair the desirable attainment of clean, well soldered electrical connections. There is the additional disadvantage that all electrical connections to be soldered by this method must be made on the bottom side of the base plate leaving any on top to be soldered by hand. Lastly, the elevated temperature of the solder bath eliminates many base-plate materials from use and often tends undesirably to impair the mechanical characteristics of those which may be used.

It is an object of the present invention, therefore, to provide a novel soldering machine and process which avoids one or more of the limitations and disadvantages of prior arrangements and methods heretofore proposed.

It is an additional object of the invention to provide a novel soldering machine and method which permits the soldering of only a discrete area or discrete areas of an article to be soldered, while presenting to such area or areas only clean molten solder free of any oxide, scum, or dross.

It is a further object of the invention to provide a new soldering machine and process which are characterized by the attainment of clean, well soldered joints by use of a minimum quantity of solder and permit the use of an appreciably wider variety of insulating materials for use as the base plate of a unitary assembly.

It is yet another object of the invention to provide a new and improved soldering machine and method which is readily adaptable to an automatic assembly technique wherein electrical components are automatically assembled and wired into one or more pre-established electrical circuits.

For a greater understanding of the present invention, together with other and further objects thereof, reference is had to the following specification taken in connection with the accompanying drawing in which.

Figures 1, 2, 4, 5, 6, 7:
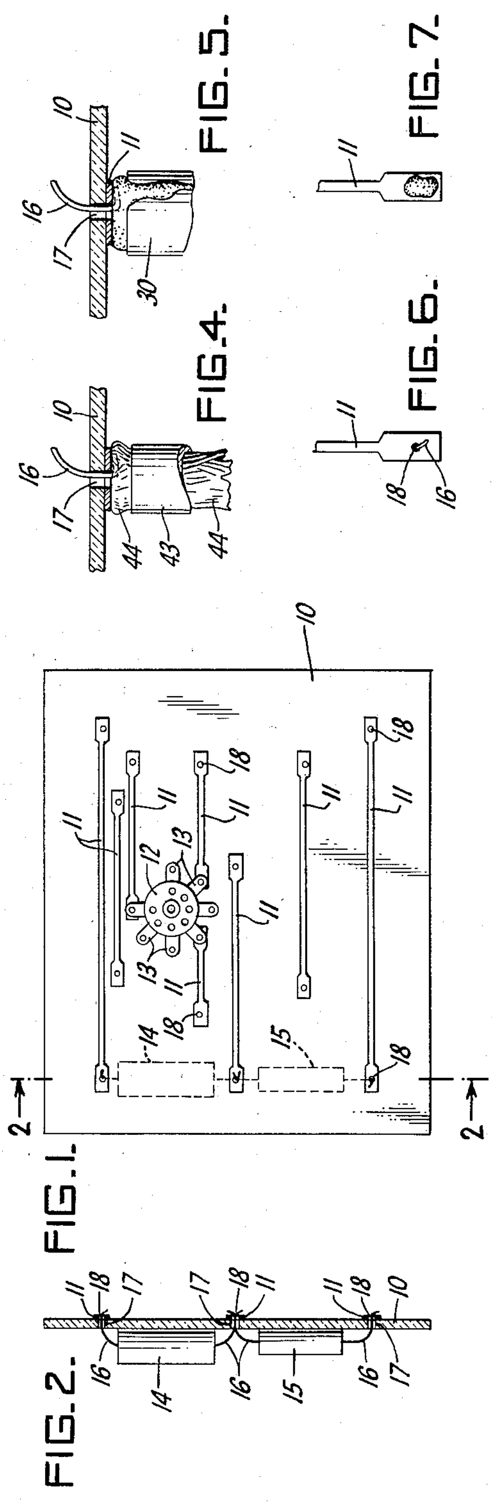
Figure 1 illustrates a unitary assembly of electrical components wired into pre-selected electrical circuits.
Figure 2 is a cross-sectional view along the plane 2—2 of Figure 1.
Figures 4 through 7, inclusive, are enlarged fragmentary illustrations used as an aid in explaining the operation of the invention.

Referring now more particularly to Figs. 1 and 2 of the drawing, the article to be soldered in certain restrictive areas thereof is illustrated as comprising a unitary assembly of electrical components such as one which might constitute a single stage signal amplifier. This assembly includes a chassis plate 10 of insulating material having a plurality of electrical circuit conductors 11 affixed to one surface thereof as by adhering a metal film or ribbon to the surface by any of several well known processes. The base plate is apertured to receive a tube socket 12 having radiating terminals 13 certain of which are to be electrically connected to individual ones of the conductors 11 as illustrated. Mounted on top of the base plate 10 are electrical components such as elements 14, 15, which may for example comprise a tubular condenser and resistor. The components 14, 15 have wire leads 16 which extend through apertures 17 of the base plate 10 and through registering apertures 18 of the conductors 11. It is desired that the leads 16 of the components 14 and 15 and certain of the terminals 13 of the socket 12 be soldered to individual ones of the conductors 11, and this is accomplished by use of a soldering machine and process embodying the present invention and which now will be described.

Figure 3:
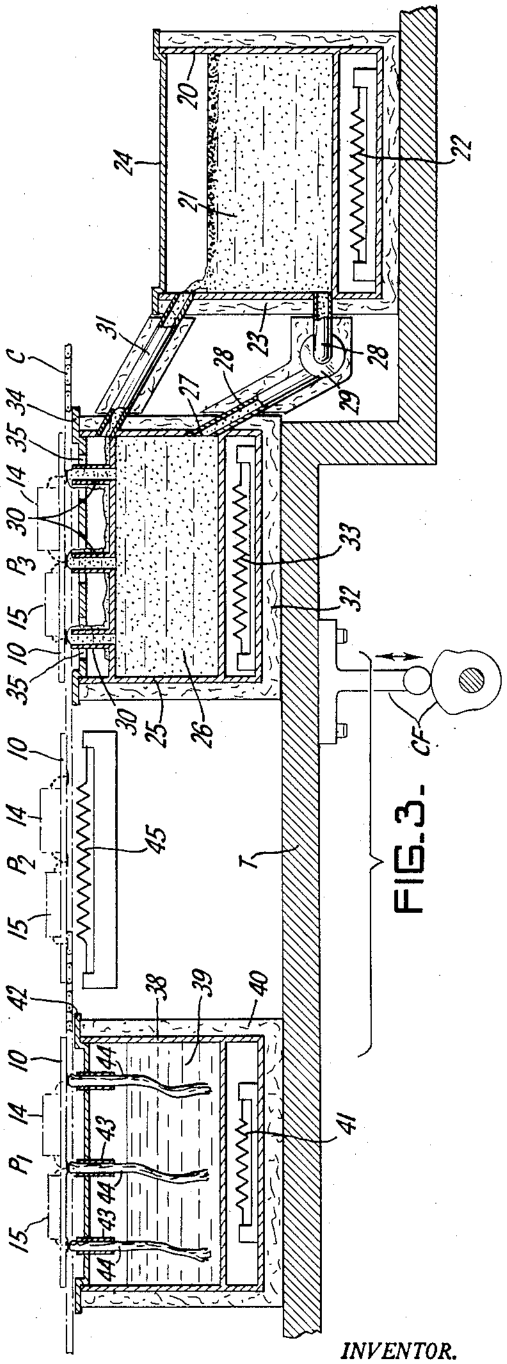
Figure 3 illustrates a soldering machine embodying the present invention and is shown as arranged to complete a plurality of soldered connections in an assembly of the Fig. 1 type.

Referring to Fig. 3, the soldering machine includes a receptacle 20 for receiving and storing a quantity of molten solder 21. The receptacle 20 is heated to a suitably elevated temperature, at which the solder 21 is in the molten state, by any conventional heat source such as an electrical heater 22 indicated diagrammatically in the drawing. The receptacle preferably is enclosed within a heat insulating jacket 23 of conventional material to minimize heat losses, and has a removable cover 24 which may also be heat jacketed if desired. The soldering machine also includes a second receptacle 25 supported with the receptacle 20 on a common platform T and providing a closed chamber 26 having a port 27 connected to a heat-insulated fluid conduit 28 opening into the receptacle 20 below the surface of the molten solder 21 therein. A fluid pump 29 is interposed in the fluid conduit 28 and is driven by any suitable means such as an electrical motor, not shown. The upper wall or ceiling of the receptacle 25 may be removable for cleaning and inspection purposes (though not so shown in the interests of simplicity) and is apertured fixedly to receive a plurality of hollow tubular solder spout members 30 having their lower ends communicating with the chamber 26 and their upper ends providing open mouth portions of restricted cross-sectional area. With this structure, molten solder is pumped under relatively light pressure by the fluid pump 29 from the receptacle 20 through the fluid conduit 28 and into the receptacle 25. The chamber 26 of the latter becomes filled with molten solder which thereafter is caused substantially continuously to flow under light pressure through the interior of and out of the open mouths of the spout members 30. This flow is in excess of normal soldering requirements and the excess of solder flows over the lip and down the exterior surfaces of the members 30 and drains through a heat-insulated fluid conduit 31 back into the receptacle 20 as indicated. The receptacle 25 preferably is also provided with a heat insulating jacket 32, a source of heat such as an electrical heater 33, and a cover 34 which may be heat jacketed if desired. The cover 34 has apertures 35 registering with the members 30 and through which the latter project.

The soldering machine also includes a third receptacle 38 supported on the platform T and containing a quantity of soldering flux 39. The receptacle 38 also is preferably jacketed with heat insulating material 40 and may be provided with a suitable heat source, such as an electrical heater 41, to maintain the flux 39 in a highly liquid form with minimum viscosity. The receptacle 38 has a removable cover 42 which is apertured fixedly to receive a plurality of sleeves 43 through which wicks 44 of felt or the like are inserted. The lower ends of the wicks 44 are submerged in the flux 39 to supply the flux by capillary action to the remote ends of the wicks.

Positioned between the flux receptacle 38 and the solder receptacle 25 is a preheat source which may be comprised by an electrical heater 45 and serves a purpose presently to be explained.

The overall operation of the soldering machine just described will now be considered. Unitary electrical assemblies to be soldered, such, for example as of the type shown in Figs. 1 and 2, are carried by a linear conveyer system indicated as C and are positioned during short intervals successively over the flux receptacle 38, the preheat source 45, and the soldering receptacle 25. The wicks 44 of the flux receptacle 38 are so positioned and arranged that each is located to engage an individual point on the base plate 10 where a soldered connection is to be made. As the base plate 10 is brought into position $P_1$ and comes to rest for a moment over the flux receptacle 38, the platform T upon which the latter rests is raised by a suitable lifting mechanism, indicated as a cam and cam follower CF, to engage the upper ends of the wicks 44 with preselected points on the chassis plate 10 as earlier mentioned and as indicated by the enlarged fragmentary illustration of Fig. 4. Flux is deposited upon the points thus engaged, whereupon the platform T is lowered by mechanism CF and the plate 10 moves over the preheat position $P_2$ above the source 45. The latter provides a certain amount of preheating to elevate somewhat the temperature of the metallic parts to be soldered so that less heating of the parts is required during their subsequent engagement with the molten solder.

The base plate 10 now is moved by the conveyer C to position $P_3$ over the solder receptacle 25 where it again comes to rest. As in a case of the wicks 44 of the flux receptacle 38, the solder spout members 30 are positioned and arranged to approach individual points on the plate 10 where a soldered connection is to be made. Thus when the solder receptacle 25 is raised by the raising mechanism CF, the molten solder which flows out of the upper ends of the solder spout members 30 is brought into engagement with those preselected points of restricted area of the plate 10 which have previously been fluxed and have been preheated as described. The engagement of the molten solder with the metallic parts to be soldered, as indicated in the enlarged view of Fig. 5, brings these parts up to the correct soldering temperature after which the solder receptacle 25 is lowered and a certain quantity of molten solder clings to the surfaces of the metallic parts with which it has been in contact and solidifies there. Fig. 6 shows an enlarged view of one of the conductors 11, with a terminal lead 16 positioned through its aperture 18 prior to the soldering step, and Fig. 7 illustrates this same conductor after the soldering step has been completed. It will be noticed from Fig. 7 that the soldering operation is in the nature of a spot soldering one covering only a restricted area of the conductor 11.

After the soldering step, last described, the plate 10 is carried by the conveyer system C beyond the soldering machine as an assembled unitary structure having all or preselected ones of its soldered connections completed. While the operation has been described in relation to an individual assembly moving along the conveyer, in practice the described operation will ordinarily be a continuous one performed on a continuous flow of such assemblies following one another at the positions $P_1$, $P_2$ and $P_3$ on the conveyer system.

Where a large number of such restricted-area soldering operations are to be performed on a unitary electrical assembly as just described, it will be understood that several soldering machines of the type described may follow one another in succession along the conveyer system with each soldering machine completing certain of the soldered connections individual to that machine and all of the electrical connections being completed by the several soldering machines.

From the foregoing description of the invention it will be apparent that each electrical joint to be soldered, or each restricted area of an article to be soldered, is always presented with flowing molten solder free of oxide, scum and dross. Clean solder is taken from near the bottom of the solder receptacle 20 and is pumped into the solder receptacle 25 where it is contained without exposure to the atmosphere until it flows out of the mouths of the solder spout members 30. Any oxide thereafter formed on the excess solder which flows back through the drain conduit 31 to the receptacle 20 collects on the surface of the molten solder 21 as does all scum and dross which may be formed during operation of the soldering machine.

The invention has been described as having all of the tips of the flux wicks 44 and the tips of the solder spout members 30 lying in a common plane, since the electrical assembly of Figs. 1 and 2 used as an illustrative example is essentially a planar structure. It will be apparent, however, that where the points to be soldered on the assembly occur at different levels or elevations, both the tips of the flux wicks 44 and the mouths of the solder spout members 30 may in like manner terminate at different elevations so that all such points are fluxed during the flux application step and later soldered during the soldering step. Due to this fact, and to the further fact that molten solder is applied only to preselected restricted areas and to no others, it is apparent that soldering in accordance with the present invention can easily and readily be accomplished on both the top and bottom sides of an assembly if this should be required or desired in a particular application.

Soldering performed by use of the invention eliminates or minimizes solder-bridging of closely spaced electrical conductors, or closely spaced restricted areas, which are to be individually soldered. All such soldering is accomplished with high efficiency of solder use since the molten solder is applied to, and is retained by, only those discrete areas which are to be soldered.

While there has been described what is at present considered to be a preferred embodiment of the invention, it will be apparent to those skilled in the art that various changes and modifications may be made therein without departing from the invention. Consequently the appended claims should be interpreted broadly, as may be consistent with the spirit and scope of the invention.

What is claimed is:

1. A machine for soldering a preselected restricted area of an article comprising the combination of an article conveyor means for moving an article into a given fixed soldering position, a heated receptacle for receiving and storing a quantity of molten solder, means providing a closed chamber having a port communicating with said receptacle below the surface of the molten solder therein, a hollow member having one end opening into said chamber and another end terminating in a vertically extending open mouth tubular portion, means for maintaining said chamber filled with said molten solder from said receptacle and for causing molten solder to flow during a soldering interval substantially continuously from said chamber through said member out and over said open mouth portion of said tubular portion back to said receptacle and means for moving said article and said hollow member vertically relative to one another to engage during a soldering interval said molten solder with said area of said article.

2. A machine for soldering preselected restricted areas of an article comprising the combination of an article conveyor means for moving an article into a given fixed soldering position, a heated receptacle for receiving and storing a quantity of molten solder, means providing a closed chamber having a port communicating with said receptacle below the surface of the molten solder therein, a plurality of hollow tubular members each having one end opening into such chamber and another end terminating in an open mouth portion, said tubular members being positioned in the same configuration as said preselected restricted areas and said open mouth portions thereof having cross sectional areas substantially equal to the corresponding restricted areas of the article, means for maintaining said chamber filled with said molten solder from said receptacle and for causing molten solder simultaneously to flow during a soldering interval substantially continuously from said chamber through said members and over and out of said open mouth portions, means for draining back into said receptacle excess molten solder flowing out said open mouth portions of said tubular members, and means for moving said article and said hollow members relative to one another to engage during a soldering interval said molten solder with said area of said article.

3. In a device for applying solder to a preselected portion of the lower surface area of an article comprising the combination of an article conveyor means for moving an article into a given fixed soldering position with the lower surface area of the article exposed, a vertically positioned hollow member terminating at its upper end in an open mouth spout portion having an overflow lip, means for mounting said hollow member beneath the article conveyor and in spaced relationship therewith, a reservoir of molten solder, means for providing a substantially continuous flow of solder during the soldering interval from said solder reservoir through the hollow portion of said member in sufficient quantity to flow over the overflow lip, means for returning the solder overflow to said reservoir, and means for reducing the spaced relationship between the article and the upper end of said hollow member during a soldering interval, to bring the portion of the lower surface of the article to be soldered adjacent the spout portion of said hollow member for engagement with overflow solder.

4. In a device for applying solder to preselected portions of the lower surface area of an article comprising the combination of an article conveyor means for moving an article into a given fixed soldering position with the lower surface area of the article exposed, a plurality of vertically positioned hollow members each terminating at its upper end in an open mouth spout portion having an overflow lip, means for mounting said hollow members beneath the article conveyor and in spaced relationship therewith, a reservoir of molten solder, means for providing a substantially continuous flow of solder during the soldering interval from said reservoir through the hollow portion of each of said members in sufficient quantity to flow over the overflow lip, means for returning the solder overflow to said reservoir, and means for reducing the spaced relationship between the article and the upper ends of said hollow members during a soldering interval, to bring the portion of the lower surface of the article to be soldered adjacent the spout portions of said hollow members for engagement with overflow solder.

References Cited in the file of this patent

UNITED STATES PATENTS

| | | |
|---|---|---|
| 485,906 | Brown | Nov. 8, 1892 |
| 1,193,425 | Robinson et al. | Aug. 1, 1916 |
| 1,446,667 | Schulz | Feb. 27, 1923 |
| 1,837,962 | Hensgen | Dec. 22, 1931 |
| 1,947,689 | Young | Feb. 20, 1934 |
| 2,152,437 | Lear | Mar. 28, 1939 |
| 2,159,091 | Kopitke | May 23, 1939 |
| 2,344,589 | Bogner | Mar. 21, 1944 |
| 2,469,392 | Jones et al. | May 10, 1949 |
| 2,515,097 | Schryber | July 11, 1950 |
| 2,579,634 | Warren | Dec. 25, 1951 |
| 2,667,138 | Maher | Jan. 26, 1954 |
| 2,770,875 | Zimmerman | Nov. 20, 1956 |

FOREIGN PATENTS

| | | |
|---|---|---|
| 216,994 | Germany | Nov. 1, 1908 |